(12) United States Patent
Katou

(10) Patent No.: US 8,847,730 B2
(45) Date of Patent: Sep. 30, 2014

(54) VEHICULAR KEYLESS ENTRY SYSTEM AND PORTABLE DEVICE THEREFOR

(75) Inventor: Kenji Katou, Nishikamo-gun (JP)

(73) Assignee: Denso Corporation, Kariya (JP)

( * ) Notice: Subject to any disclaimer, the term of this patent is extended or adjusted under 35 U.S.C. 154(b) by 437 days.

(21) Appl. No.: 13/317,873

(22) Filed: Oct. 31, 2011

(65) Prior Publication Data

US 2012/0105196 A1 May 3, 2012

(30) Foreign Application Priority Data

Nov. 1, 2010 (JP) ................................. 2010-245348

(51) Int. Cl.
*G05B 19/00* (2006.01)
*G05B 23/00* (2006.01)
*B60R 25/24* (2013.01)

(52) U.S. Cl.
CPC .................................. *B60R 25/245* (2013.01)
USPC ..................... 340/5.61; 340/5.64; 340/426.13; 340/426.15

(58) Field of Classification Search
USPC ...................... 340/5.61, 5.64, 426.13–426.17; 455/456.1–456.6
See application file for complete search history.

(56) References Cited

U.S. PATENT DOCUMENTS

| | | | |
|---|---|---|---|
| 6,552,649 B1 * | 4/2003 | Okada et al. .................. | 340/5.61 |
| 7,400,243 B2 | 7/2008 | Sumida et al. | |
| 2002/0107916 A1 * | 8/2002 | Nii et al. ........................ | 709/203 |
| 2006/0290503 A1 * | 12/2006 | Sumida et al. ............. | 340/572.1 |
| 2007/0115095 A1 | 5/2007 | Eguchi | |
| 2009/0289759 A1 | 11/2009 | Tsuchiya et al. | |

FOREIGN PATENT DOCUMENTS

| | | |
|---|---|---|
| JP | 2006-97309 | 4/2006 |
| JP | 2007-9428 | 1/2007 |
| KR | 2010-0102327 | 9/2010 |

OTHER PUBLICATIONS

Office Action issued Oct. 30, 2012 in corresponding Japanese Application No. 2010-245348 with English translation.
Office Action issued Nov. 8, 2012 in corresponding Korean Application No. 10-2011-112020 with English translation.

* cited by examiner

*Primary Examiner* — Steven Lim
*Assistant Examiner* — Omeed Alizada
(74) *Attorney, Agent, or Firm* — Harness, Dickey & Pierce, PLC

(57) ABSTRACT

A vehicular keyless entry system is formed of an in-vehicle device and a plurality of portable devices. The portable device stores received checkup area identification information in a memory circuit. The portable device transmits a response signal including the stored checkup area information and portable device identification information, when a request signal is received from an in-vehicle device. The in-vehicle device checks up a plurality of portable devices based on the portable device identification information included in the response signal, and determines locations of the plurality of portable devices based on the checkup area identification information included in the response signal. The in-vehicle device performs vehicle door locking control operation based on a determination result.

7 Claims, 6 Drawing Sheets

VEHICULAR KEYLESS ENTRY SYSTEM AND PORTABLE DEVICE THEREFOR

CROSS REFERENCE TO RELATED APPLICATION

This application is based on and incorporates herein by reference Japanese patent application No. 2010-245348 filed on Nov. 1, 2010.

FIELD OF THE INVENTION

The present invention relates to a vehicular keyless entry system, which includes an in-vehicle device and a plurality of portable devices, for performing checking of each portable device and a door lock control operation on a vehicle door based on whether the portable device is inside or outside a vehicle compartment. The present invention also relates to a portable device for such a vehicular keyless entry system.

BACKGROUND OF THE INVENTION

A variety of vehicular keyless entry systems are proposed (for example, JP 2008-14019A corresponding to US 2009/0289759 A1). Each of the systems checks up a portable device and controls locking and unlocking operations of a vehicle door and starting a vehicle engine in accordance with a result of checkup.

Some of the vehicular keyless entry systems described above are capable of checking up any one of authorized portable devices as an object of checkup, so that the vehicle door may be locked or unlocked or the vehicle engine may be started by any one of the authorized portable devices.

According to the vehicular keyless entry systems, although an authorized portable device is being locked in inside a vehicle compartment, the vehicle door may inadvertently be locked by successful checkup about the other authorized portable device carried by a user.

An unauthorized third person may intrude into the vehicle compartment by shattering a windshield glass under a condition that the vehicle door is being locked by the checkup operation about the other authorized portable device carried by the user with the authorized portable device being left inside the vehicle compartment. In this instance, the checkup operation will be made successfully about the authorized portable device left in the vehicle compartment. It is thus likely that the vehicle engine will be started and the vehicle will be stolen.

It is preferred that the vehicle door is locked in performing the vehicle door locking control operation after confirming that all the authorized portable devices are outside the vehicle compartment and no other authorized portable devices are inside the vehicle compartment.

In case of a plurality of authorized portable devices, it need be specified whether each portable device is detected inside the vehicle compartment or outside the vehicle or not detected. For this purpose, the checkup operation must be performed with respect to each portable device by switching over areas of checkup operation.

If the area of checkup operation is switched over sequentially with respect to each portable device to specify the location of the portable device, it takes a long time to lock the door, thus resulting in poor response. The response gets worse as the number of authorized potable devices increases.

SUMMARY OF THE INVENTION

It is therefore an object of the present invention to provide a vehicular keyless entry system and a portable device, which improve response of a vehicle door locking operation.

According to the present invention, a vehicular keyless entry system is formed of an in-vehicle device and a plurality of portable devices. The in-vehicle device causes each of a plurality of antennas, which is for checking up a plurality of portable devices, to transmit an area identification signal including checkup area identification information in response to an instruction of starting a vehicle door locking control operation. The checkup area identification information is different from checkup area to checkup area, that is, from antenna to antenna. Each portable device stores therein the checkup area identification information of the received area identification signals. The in-vehicle device transmits request signals to the plurality of portable devices after transmitting the area identification signals. When the request signal is received from the in-vehicle device, the portable device transmits a response signal including portable device identification information and all the stored checkup area identification information. The in-vehicle device checks up the plurality of portable devices based on the portable device identification information included in the response signal transmitted from the portable device, which received the request signal, and determines locations of the plurality of portable devices based on the checkup area identification information included in the response signal. The in-vehicle device performs the vehicle door locking control operation based on the checkup result of the portable device.

Each of the portable devices includes a memory circuit, a memory control circuit and a transmitter circuit. The memory control circuit stores in the memory circuit the checkup area identification information included in each of the area identification signals upon reception of the area identification signals from the plurality of antennas. The transmitter circuit transmits the response signal upon receipt of the request signal from the in-vehicle device. The response signal includes the portable device identification information for identifying the portable device and all the checkup area identification information stored in the memory circuit.

DETAILED DESCRIPTION OF THE EMBODIMENT

Figure 1:
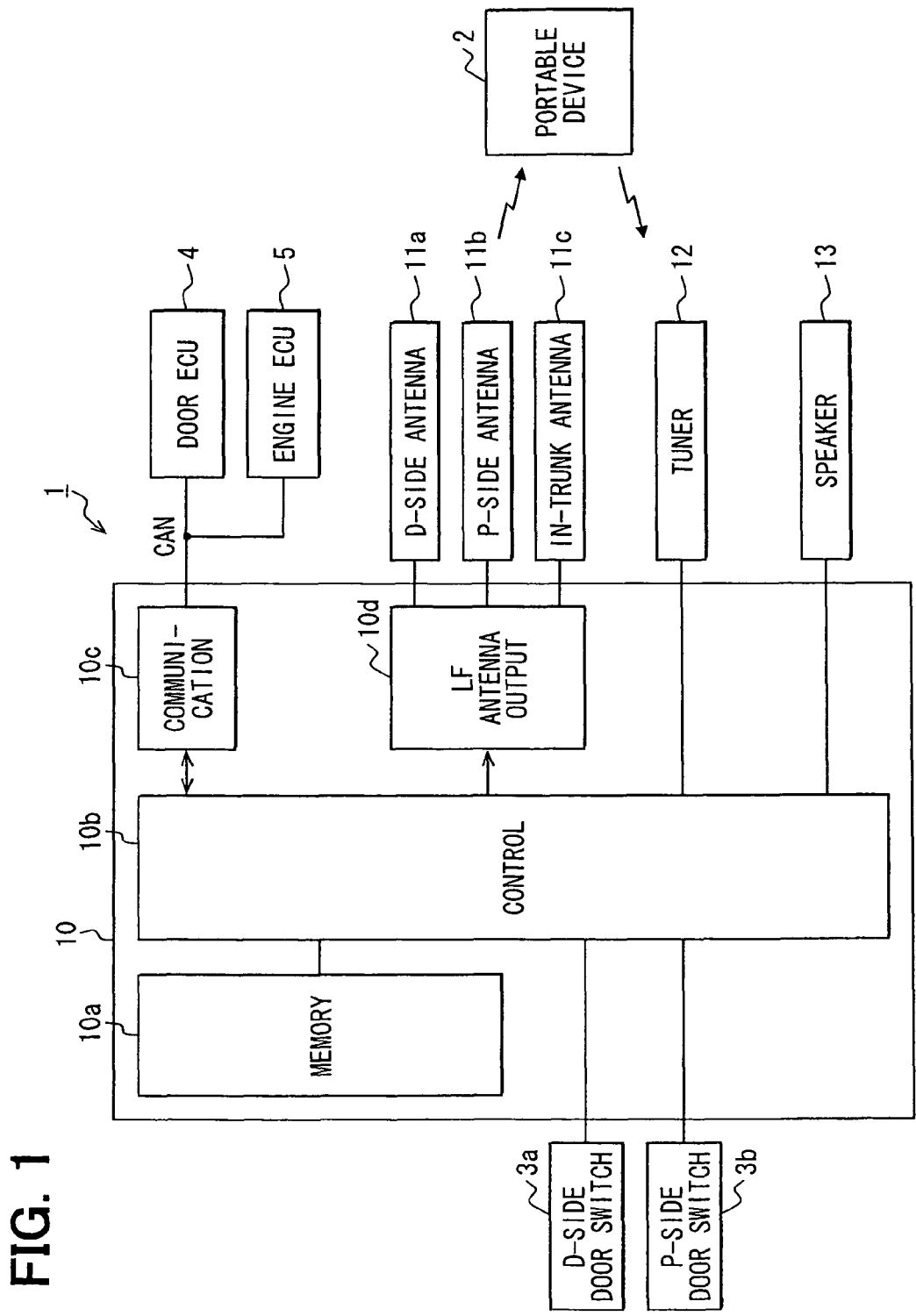
FIG. 1 is a block diagram of a vehicular keyless entry system according to one embodiment of the present invention.

Referring to FIG. 1, a vehicular keyless entry system is formed of an in-vehicle device 1 and a portable device 2. Although only one portable device 2 is shown, a plurality of portable devices is provided for this system. The in-vehicle 1 device includes a checkup ECU 10, a D-side (driver-seat side) antenna 11a, a P-side (front passenger or assistant-seat side) antenna 11b, an in-trunk antenna 11c, a tuner 12 and a speaker 13. The checkup ECU 10 is connected with a D-side door switch 3a, a P-side door switch 3b, a door ECU 4 and an engine ECU 5.

The in-vehicle device 1 is mounted in the vehicle. Antennas 11a to 11c are provided at different parts of the vehicle and driven to transmit radio waves for checking up the portable device 2, which is used as an electronic key. The portable device 2 is checked up by determining reception of response data, which is transmitted from the portable device 2 in response to the transmission of the radio waves. The vehicle door locking and unlocking control operation and the vehicle engine starting control operation are performed in accordance with the check-up results.

The checkup ECU 10 includes a memory circuit 10a, a control circuit 10b, a communication circuit 10c and an LF (low frequency) antenna output circuit 10d. The memory circuit 10a is for storing various data and is formed of memories including a RAM, a ROM and an EEPROM.

The control circuit 10b is formed as a computer including a CPU, an I/O and the like. The CPU performs various processing according to programs stored in the memory circuit 10a, for example in ROM.

The communication circuit 10c is for communicating with the door ECU 4, the engine ECU 5 and the like connected with a CAN (controlled-area network) provided as a vehicle LAN.

The LF antenna output circuit 10d generates signals in a LF band in response to a signal inputted from the control circuit 10b and drives the antennas 11a to 11c to transmit respective radio waves in response to the generated signals.

The D-side antenna 11a is located inside a pillar provided between a front seat and a rear seat on the driver-seat side in the vehicle. The P-side antenna 11b is located inside a pillar provided between a front seat and a rear seat in the vehicle, which are on a side opposite to the driver-seat side. The in-trunk antenna 11c is located inside a trunk, which is a rear luggage space in the vehicle. Each antenna 11a to 11c transmits radio waves in response to the signals inputted from the checkup ECU 10.

The tuner 12 is a device for receiving response data transmitted from the portable device 2.

The checkup ECU 10 is connected with the door ECU 4, which locks and unlocks doors of the vehicle, and the engine ECU 5, which controls an engine in the vehicle. The checkup ECU 10 realizes various functions. For example, the checkup ECU 10 outputs various instructions to the door ECU 4 to perform a locking control operation and an unlocking control operation for each vehicle door. The checkup ECU 10 also outputs various instructions to the engine ECU 5 to perform vehicle engine starting control operation.

The checkup ECU 10 drives the D-side antenna 11a and the P-side antenna 11b to transmit radio waves for checking up the potable device 2. The D-side antenna 11a is for use in checking up a portable device, which is present within a checkup area 11A (FIG. 3) that includes the vehicle compartment and a vehicle outside area on a driver-seat side. The P-side antenna 11b is for use in checking up a portable device, which is present within a checkup area 11B (FIG. 3) that includes the vehicle compartment and a vehicle outside area on a front passenger-seat side.

The checkup ECU 10 is configured to improve response at the time of, for example, a vehicle door locking operation. For this purpose, the checkup ECU 10 transmits from the antennas 11a to 11c area identification signals including respective checkup identification information, which are different among a plurality of checkup areas, for checking up a portable device present outside the vehicle compartment and a portable device present inside the vehicle compartment. Thus, the checkup identification information are different among the antennas 11a to 11c to define different checkup areas.

Figure 2:
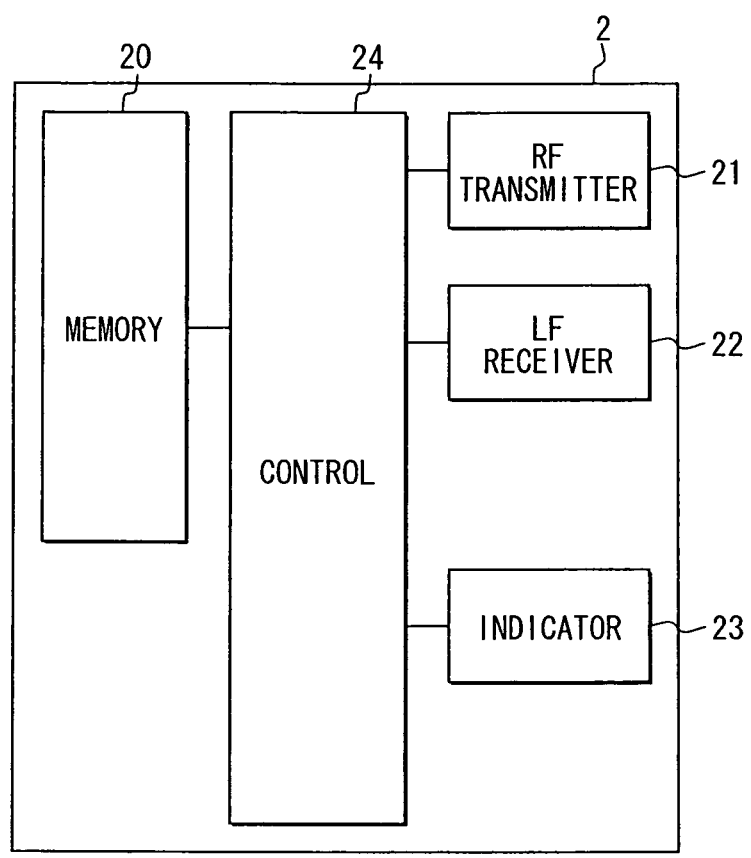
FIG. 2 is a block diagram of a portable device according to one embodiment of the present invention.

Each portable device 2 is configured as shown in FIG. 2. The portable device 2 includes a memory circuit 20, a RF transmitter circuit 21, a LF receiver circuit 22, an indicator circuit 23 and a control circuit 24.

The memory circuit 20 includes an EEPROM as a non-volatile memory device. The memory circuit 20 stores portable device identification information (key ID) for use in checking up a portable device by the checkup ECU 10 of the in-vehicle device 1.

The LF receiver circuit 22 receives through a receiving antenna (not shown) a radio wave in a LF band transmitted from the in-vehicle device 1. The RF transmitter circuit 21 outputs from a transmitting antenna (not shown) a signal in a RF band in response to a signal inputted from the control circuit 24.

The indicator circuit 23 is for notification of reception of the signal in the LF band and formed of a LED, which is activated by a signal inputted from the control circuit 24.

The control circuit 24 is formed as a computer including a CPU, a ROM, a RAM, an I/O and the like. The CPU performs various processing in accordance with programs stored in the ROM.

The portable device 2 is configured to store in the memory circuit 20, when receiving the area identification signal from the in-vehicle device 1, the checkup area identification information of the area identification signal of the received signal. The portable device 2 is configured to transmit, when receiving a request signal from the in-vehicle device 1, a response signal including a portable device identification information (key ID) and all checkup area identification information (area ID). The portable device identification information is for identifying the portable device 2. The checkup area identification information (area ID) is stored in the memory circuit 20.

The vehicular keyless entry system checks up the portable device and determines the location of the same by transmitting radio waves from the plurality of antennas 11a to 11c for sequential checkup operations.

Figure 3:
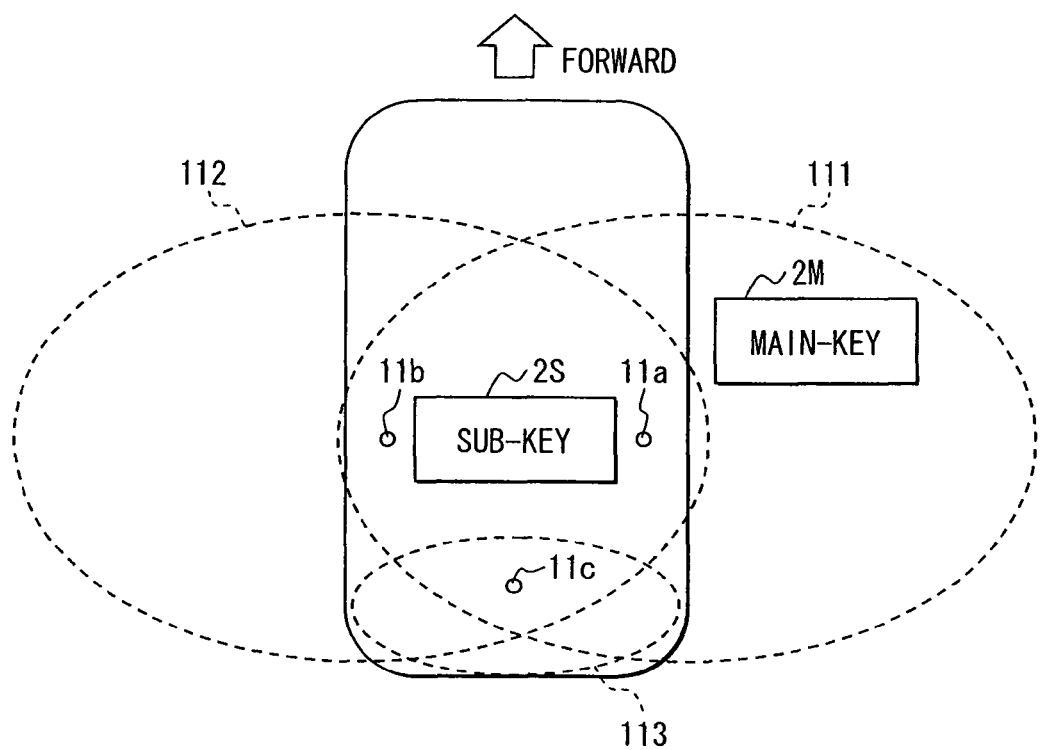
FIG. 3 is an explanatory view of a D-side checkup area, a P-side checkup area and an in-trunk checkup area.

FIG. 3 shows a checkup area (D-side checkup area) 11A in case of a checkup operation by the D-side antenna 11a, a checkup area (P-side checkup area) 11B in case of a checkup operation by the P-side antenna 11b and a checkup area (in-trunk checkup area) 11C in case of a checkup operation by the in-trunk antenna 11c.

When a first one of the portable devices 2 as a main key 2M is present outside the vehicle at the D-side, that is, in the area 11A, as exemplified in FIG. 3, the main key 2M receives the area identification signal transmitted from the D-side antenna 11a but does not receive the area identification signal transmitted from the P-side antenna 11b. Therefore, the memory circuit 20 of the main key 2M stores the checkup area identification information (area ID) included in the area identification signal transmitted from the D-side antenna 11a but does not store the checkup area identification information (area ID) included in the area identification signal transmitted from the P-side antenna 11b.

When a second one of the portable devices 2 as a sub-key 2S is present inside the vehicle compartment, that is, in the area 11B, the sub-key 2S receives both the area identification signal transmitted from the D-side antenna 11a and the area identification signal transmitted from the P-side antenna 11b. Therefore, the memory circuit 20 of this sub-key stores both of the checkup area identification information (area ID) included in the area identification signal transmitted from the D-side antenna 11a and the checkup area identification information (area ID) included in the area identification signal transmitted from the P-side antenna 11b.

Transmission and reception of the D-side event checkup data is described with reference to FIG. 4 assuming that the D-side checkup area is an area of communication. The checkup ECU 10 causes the antennas 11a to 11c to sequentially transmit the area identification signals including respective checkup area identification information, which are different among the checkup areas, in response to an instruction of starting a vehicle door locking control operation.

The D-side antenna 11a is caused to transmit the area identification signal that includes the area (ARA) ID1 as the checkup area identification information following a header (HDR). Next, the P-side antenna 11b is caused to transmit the area identification signal that includes the area ID2 as the checkup area identification information. In addition, the in-trunk antenna 11c is caused to transmit the area identification signal that includes the area ID3 as the checkup area identification information. The portable device 2 (2A, 2B) stores all the received area identification signals in the memory circuit 20 when the area identification signals are received.

Next, the D-side antenna 11a is caused to transmit its request signal, which sets the key ID1 as the portable device identification information. When the portable device 2 (main key 2M), which sets therein the key ID1 as its portable device identification information, receives the request signal, the portable device 2 encrypts the response signal, which includes its portable device identification information and all the area identification signals stored in the memory circuit 20, and transmits them. For example, the response signal including the area ID1 and the key ID1 is encrypted and transmitted.

When the checkup ECU 10 receives the response signal transmitted from the portable device 2 (main key 2M) in response to transmission of the request signal, the checkup ECU 10 finishes this D-side event checkup operation.

When the checkup ECU 10 does not receive the response signal from the portable device 2 in response to transmission of the request signal, the checkup ECU 10 does not stop the D-side event checkup operation but causes the D-side antenna 11a to transmit the request signal, which includes the key ID2 as the portable device identification information. When the portable device 2 (sub-key 2S), which sets the key ID2 therein as its portable device identification information, receives the request signal, the portable device 2 encrypts the response signal, which includes all the area identification signals stored in the memory circuit 20 and its portable device identification information, and transmits it.

When the checkup ECU 10 receives the response signal transmitted from the portable device 2 (sub-key 2S) in response to transmission of the request signal, the checkup ECU 10 finishes this D-side event checkup operation.

As described above, the checkup ECU 10 finishes the D-side event checkup operation at the time of reception of the response signal from the portable device 2 and then performs the D-side event checkup operation for other portable devices having key IDN by excluding the portable device 2, which received the response signal. Thus, the D-side event checkup operation is performed about a plurality of portable devices 2, which include the key ID1, key ID2 through key IDN as portable device identification checkup operation, respectively.

Thus, the checkup ECU 10 is capable of determining, based on the checkup area identification information ARA ID included in the response signal transmitted from the portable device 2, in which area in FIG. 3 the portable device 2 is located.

Figure 5:
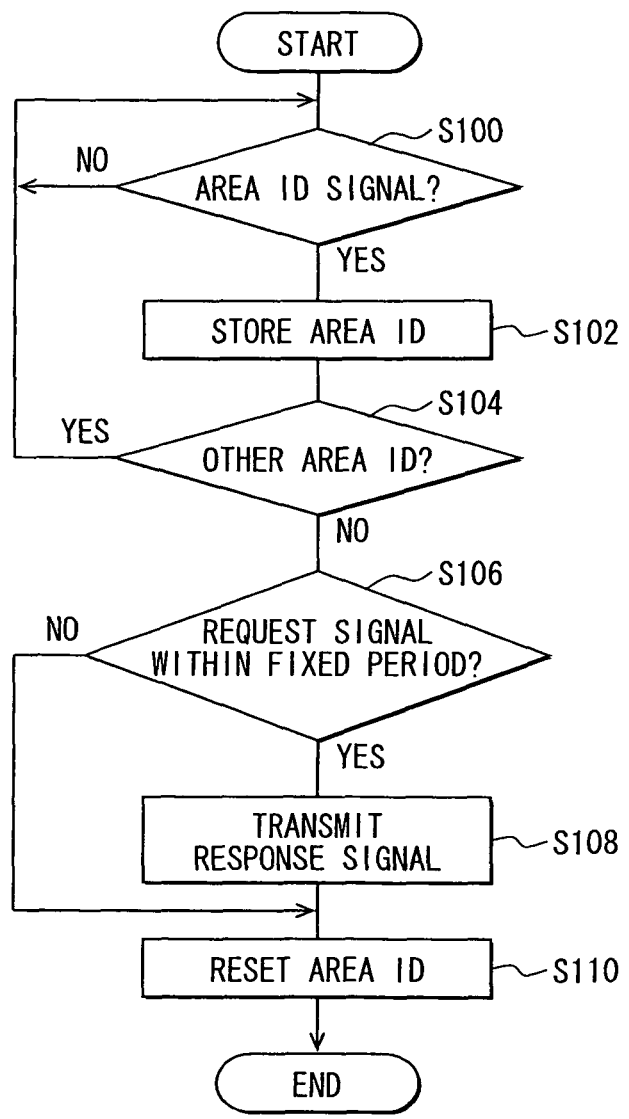
FIG. 5 is a flowchart of control processing of a control circuit in the portable device.

The portable device 2, particularly the control circuit 24, is configured to perform the processing shown in FIG. 5 in a flowchart form. The control circuit 24 periodically performs this processing.

The control circuit 24 first checks whether the area identification signal ARA ID is received (S100). Specifically, it checks whether the area identification signal is received based on whether a signal, which indicates that the LF receiver circuit 22 received the area identification signal, is inputted from the LF receiver circuit 22.

If the LF receiver circuit 22 does not receive the area identification signal, the present processing is finished. If the area identification signal, which indicates that the LF receiver circuit 22 received the area identification signal, is inputted from the LF receiver circuit 22, the checkup result at S100 becomes YES. The control circuit 24 stores, in the memory circuit 20, the checkup area identification information included in the area identification signal at S102.

The control circuit 24 then checks whether the other area identification signal is received (S104). Specifically, the control circuit 24 checks whether the other area identification signal is received within a fixed period after determining at S100 that the area identification signal was received.

If the other area identification signal is received within a first fixed period after determining at S100 that the area identification signal is received, the checkup result at S104 becomes YES. The control circuit 24 stores in the memory circuit 20 the checkup area information included in the received other area identification signal at S102. Thus each checkup area information included in the received area identification signal is stored successively in the memory circuit 20 each time the area identification signal is received.

If the other area identification signal is not received within the first fixed period after determining at S100 that the area identification signal was received, the checkup result at S104 becomes NO. The control circuit 24 then checks at S106 whether the request signal is received within a second fixed period.

If the request signal is transmitted from any one of the antennas 11a to 11c in response to the instruction of the checkup ECU 10 and the request signal is received, the checkup result at S106 becomes YES. The control circuit 24 causes transmission of the response signal including its portable device identification information (key ID) and all the checkup area identification information (area ID) stored in the memory circuit 20 (S108).

Next all the checkup area identification information (area ID) stored in the memory circuit 20 are reset (erased) at S110, and this processing is finished.

If the request signal is not received within the fixed period, all the checkup area identification information (area ID) stored in the memory circuit 20 are reset (erased) at step S110 and this processing is finished.

Figure 6:
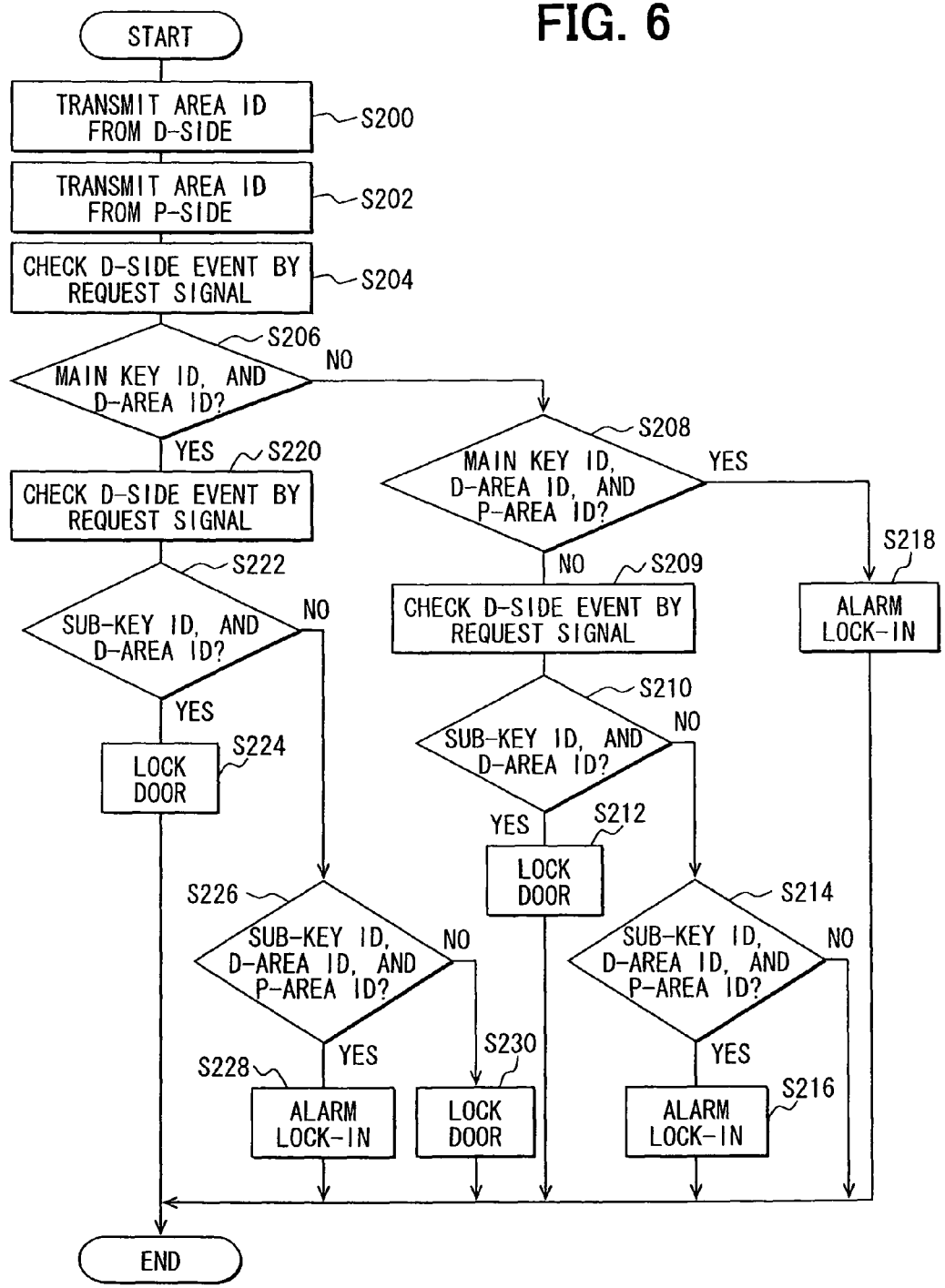
FIG. 6 is a flowchart of control processing of a checkup ECU in case of an operation on a D-side door switch.

The checkup ECU 10 of the in-vehicle device 1, particularly the control circuit 10b, is configured to perform the processing shown in FIG. 6 in a flowchart form. It is assumed that the main key 2M and the sub-key 2S are registered as authorized portable devices 2 and an operation is performed on the D-side door switch 3a. In this flowchart, the checkup operation about the portable device 2 in the trunk is omitted. The checkup ECU 10 performs the processing shown in FIG. 6, when the D-side door switch 3a is operated by, for example, a driver, at the time of leaving the vehicle, and a signal corresponding to the operation on the D-side door switch 3a is inputted.

Figure 4:
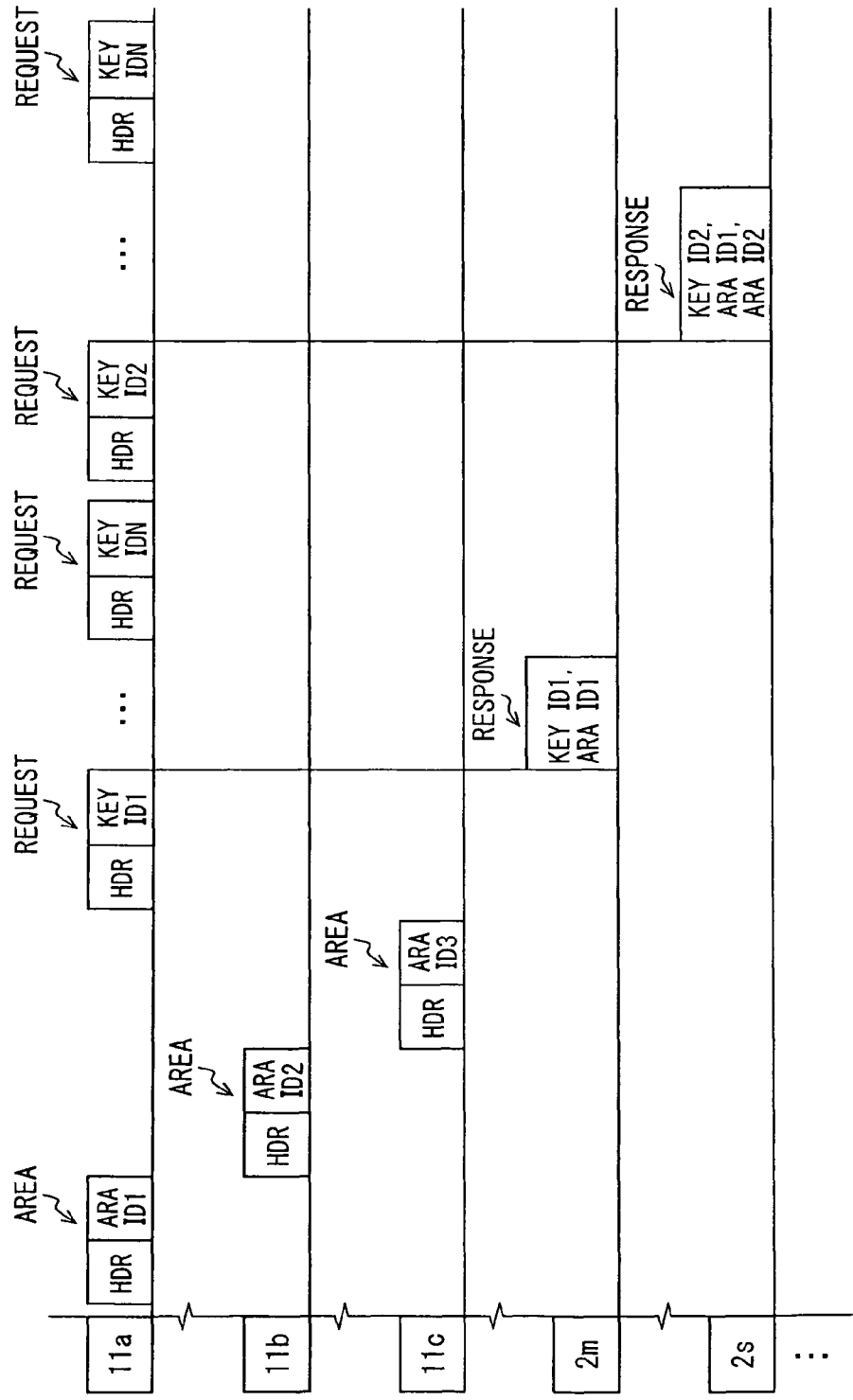
FIG. 4 is an explanatory chart of transmission and reception of data of a D-side event checkup operation for a D-side checkup area as a checkup object.

The checkup ECU 10 causes the D-side antenna 11a to transmit the area identification signal (S200) and then causes the P-side antenna 11*b* to transmit the area identification signal (S202) in sequence as exemplified in FIG. 4. The portable device 2 stores in the memory circuit 20 the checkup area information included in the area identification signal in response to reception of each of the area identification signals.

The checkup ECU 10 then performs the D-side event checkup (S204) with respect to the main key 2M. Specifically, the checkup ECU 10 causes the D-side antenna 11*a* to transmit the request signal for the main key 2M and checks whether the response signal transmitted from the main key 2M in response to the request signal is received. The checkup ECU 10 finishes the D-side event checkup operation after determining that the response signal is received from the main key 2M.

The checkup ECU 10 checks at S206 whether the response signal, which includes the key ID of the main key 2M as the portable device identification information and the D-side area ID as the checkup area identification information indicating that the main key 2M is located in the D-side checkup area, is received. That is, the checkup ECU 10 checks whether the portable device 2 as the main key 2M is located in the D-side checkup area and located outside the vehicle compartment.

If the checkup result at S206 is NO, the checkup ECU 10 checks at S208 whether the response signal, which includes the key ID of the main key 2M as the portable device identification information, the D-side area ID as the checkup area identification information indicating that the main key 2M is located in the D-side checkup area and the P-side area ID as the checkup area identification information indicating that the main key 2M is located in the P-side checkup area, is received. That is, the checkup ECU 10 checks whether the portable device 2 as the main key 2M is located in the vehicle compartment, in which the D-side checkup area and the P-side checkup area overlap. If the checkup result at S208 is NO indicating that the main key 2M is not inside the vehicle compartment, the checkup ECU 10 then performs the D-side event checkup at S209 and S220 with respect to the sub-key 2S.

Specifically, the checkup ECU 10 causes the D-side antenna 11*a* to transmit the request signal for the sub-key 2S and checks whether the response signal transmitted from the sub-key 2S in response to the request signal is received. The checkup ECU 10 finishes the D-side event checkup after determining that the response signal is received from the sub-key 2S.

The checkup ECU 10 checks at S210 whether the response signal, which includes the key ID of the sub-key 2S as the portable device identification information and the D-side area ID as the checkup area identification information indicating that the sub-key 2S is located in the D-side checkup area, is received. That is, the checkup ECU 10 checks whether the portable device 2 as the sub-key 2S is located in the D-side checkup area and located outside the vehicle compartment.

If the checkup result at S210 is NO, the checkup ECU 10 checks at S214 whether the response signal, which includes the key ID of the sub-key 2S as the portable device identification information, the D-side area ID as the checkup area identification information indicating that the sub-key 2S is located in the D-side checkup area and the P-side area ID as the checkup area identification information indicating that the sub-key 2S is located in the P-side checkup area, is received. That is, the checkup ECU 10 checks whether the portable device 2 as the sub-key 2S is located in the vehicle compartment.

Therefore, when the portable device 2 as the main key 2M is in the D-side checkup area and outside the vehicle compartment and the portable device 2 as the sub-key 2S is in the D-side checkup area and outside the vehicle compartment, that is, when all the portable devices 2 are outside the vehicle compartment, the checkup result at S206 becomes YES and the checkup result at S222 becomes YES. The checkup ECU 10 thus performs the vehicle door locking control operation (S224), which locks the vehicle door, and finishes this processing.

When the portable device 2 as the main key 2M is in the D-side checkup area and outside the vehicle compartment but the portable device 2 as the sub-key 2S is inside the vehicle compartment, the checkup result at S206 becomes YES, the checkup result at S222 becomes NO, and the checkup result at S226 becomes YES. The checkup ECU 10 thus generates an alarm of lock-in to notify that the portable device 2 is left and locked in inside the vehicle compartment (S228). Specifically, the checkup ECU 10 drives the speaker 13 to output alarm sound and finishes this processing.

Further, for example, when the portable device 2 as the main key 2M is in the D-side checkup area and outside the vehicle compartment and the portable device 2 as the sub-key 2S is not detected, the checkup result at S206 becomes YES, the checkup result at S222 becomes NO and the checkup result at S226 becomes NO. The checkup ECU 10 thus performs the vehicle door locking control operation (S230) and finishes this processing.

Further, when the portable device 2 as the main key 2M is in the D-side checkup area and outside the vehicle compartment and the portable device 2 as the sub-key 2S is in the D-side checkup area and is outside the vehicle compartment, the checkup result at S206 becomes YES, the checkup result at S222 becomes YES. The checkup ECU 10 thus performs the vehicle door locking control operation (S224) and finishes this processing.

Further, when the portable device 2 as the main key 2M is inside the vehicle compartment and the portable device 2 as the sub-key 2S is in the D-side checkup area and outside the vehicle compartment, the checkup result at S206 becomes NO, the checkup result at S208 becomes NO and the checkup result at S210 becomes YES. The checkup ECU 10 thus performs the vehicle door locking control operation (S212) and finishes this processing.

When the portable device 2 as the main key 2M is inside the vehicle compartment and the portable device 2 as the sub-key is also inside the vehicle compartment, the checkup result at S206 becomes NO, the checkup result at S208 becomes NO, the checkup result at S210 becomes NO and the checkup result at S214 becomes YES. The checkup ECU 10 thus generates an alarm of lock-in to notify that the portable device 2 is locked in inside the vehicle compartment (S216). Specifically, the checkup ECU 10 drives the speaker 13 to output the alarm sound and finishes this processing.

When the portable device 2 as the main key 2M is inside the vehicle compartment, the checkup result at S206 becomes NO and the checkup result at S208 becomes YES. The checkup ECU 10 thus generates an alarm of lock-in to notify that the authorized portable device is locked in inside the vehicle compartment (S218). Specifically, the checkup ECU 10 drives the speaker 13 to output the alarm sound and finishes this processing.

According to the above-described embodiment, the in-vehicle device causes each the plurality of antennas, which is for checking up a plurality of portable devices, to transmit the area identification signal including checkup area identification information in response to the instruction of starting the vehicle door locking control operation. The checkup area identification information is different from checkup area to checkup area. When the request signal is received from the in-vehicle device, each portable device stores the checkup area identification information of the received area identification signals in the memory circuit, and transmits the response signal including the portable device identification information and all the checkup area identification information stored in the memory circuit. The in-vehicle device transmits the request signal to the plurality of portable devices after transmitting the area identification signals. The in-vehicle device checks up the plurality of portable devices based on the portable device identification information included in the response signal transmitted from the portable device, which received the request signal, and determines locations of the plurality of portable devices based on the checkup area identification information included in the response signal. The in-vehicle device performs the vehicle door locking control operation based on the checkup result of the portable device. As a result, the response of the door lock operation can be improved.

Further, the in-vehicle device can determine that the portable device, which transmitted the response signal, is inside the vehicle compartment, when the response signal includes both of the checkup area identification information included in the area identification signals transmitted from the driver-seat side antenna and the assistant-seat side antenna.

Further the in-vehicle device can determine that the portable device, which transmitted the response signal, is outside the vehicle compartment, when the response signal includes the checkup area identification information transmitted from the driver-seat side antenna and does not include the checkup area information transmitted from the assistant-seat side antenna.

Further, the in-vehicle device can determine that the portable device, which transmitted the response signal, is outside the vehicle compartment, when the response signal includes the checkup area identification information transmitted from the assistant-seat side antenna and does not include the checkup area information transmitted from the driver-seat side antenna.

The portable device transmits, upon receipt of the request signal from the in-vehicle device, the response signal including the portable device identification information, which identifies the portable device, and all the checkup area identification information stored in the memory circuit. As a result, the response of the door lock operation can be improved.

Further, the portable device erases all the checkup area identification information stored in the memory circuit, when the response signal is transmitted. As a result, it is possible to prevent transmission of erroneous checkup area identification information, when the vehicle door locking control operation is performed next time.

Further, the portable device erases all the checkup area identification information stored in the memory circuit, when a predetermined period elapses after the area identification signal is received. As a result, it is possible to prevent the erroneous checkup area identification information, when the vehicle door locking control operation is performed next time.

The present invention is not limited to the above-described embodiment but may be implemented in various other embodiments.

For example, according to the above-described embodiment, the checkup is performed as follows at the time of vehicle door locking operation. Each of a plurality of antennas transmits an area identification signal including area identification information, which is different from checkup area to checkup area, for checking up the plurality of portable devices. The plurality of portable devices is checked up based on the portable device identification information included in the response signal transmitted from the portable device and the locations of the plurality of portable devices is determined based on the checkup area identification information included in the response signal. The vehicle door locking control operation is performed based on this determination result. It is however possible to perform the above-described operation in a checkup operation at the time of vehicle door unlocking control and in a vehicle engine starting operation.

According to the above-described embodiment, it is assumed that the D-side door switch 3a provided in the driver-seat side door of the vehicle is operated by a passenger. For example, however, it is possible to perform the above-described operation in an automatic locking control operation, which automatically performs the locking control operation, when a passenger gets off the vehicle and leaves the vehicle without operating the door switch. In this case, the processing shown in FIG. 6 may be performed, when it becomes impossible to determine that the portable devices carried by a passenger are within a vehicle outside checkup area.

What is claimed is:

1. A vehicular keyless entry system comprising:
a plurality of portable devices; and
an in-vehicle device for performing checkup about the plurality of portable devices and a vehicle door locking control operation,
wherein the in-vehicle device includes a plurality of antennas provided for checking up the plurality of portable devices, and a checkup unit, which causes the plurality of antennas to transmit area identification signals including checkup area identification information in response to an instruction of starting a vehicle door locking control operation, the checkup area identification information being different among checkup areas;
wherein each of the plurality of portable devices is configured to store the checkup area identification information of all of received area identification signals in response to reception of the area identification signals from the in-vehicle device,
wherein each of the plurality of portable devices are configured to transmit a response signal including portable device identification information thereof, which is different among the portable devices, and all stored checkup area identification information, when a request signal is received from the in-vehicle device;
wherein the checkup unit is configured to cause the plurality of antennas to transmit request signals to the plurality of portable devices after transmission of the area identification signals, and configured to check up the plurality of portable devices based on the portable device identification information included in the response signals transmitted from the portable devices, which received the request signals, and determines location of the plurality of portable devices based on the checkup area identification information included in the response signals;
wherein the checkup unit is further configured to perform a vehicle door locking control operation based on checkup results of the portable device checkup part; wherein the portable device includes a memory circuit, a memory control circuit for storing in the memory circuit the checkup area identification information included in each of the area identification signals upon reception of the area identification signals from the plurality of antennas, and a transmitter circuit for transmitting the response signal upon receipt of the request signal from the in-vehicle device, the response signal including the portable device identification information for identifying the portable device and all the checkup area identification information stored in the memory circuit; and wherein the memory control circuit is configured to erase all the checkup area identification information stored in the memory circuit when the response signal is transmitted from the transmitter circuit.

2. The vehicular keyless entry system according to claim 1, wherein:

the checkup unit is configured to cause a driver-seat side antenna and an assistant-seat side antenna to transmit sequentially the area identification signals including the checkup area identification information different among the checkup areas, the driver-seat side antenna being for checking up a portable device located in a checkup area including an inside of a vehicle compartment and an outside of the vehicle compartment at a driver-seat side, and the assistant-seat side antenna being for checking up a portable device located in a checkup area including the inside of the vehicle compartment and the outside of the vehicle compartment at an assistant-seat side.

3. The vehicular keyless entry system according to claim 2, wherein:

the checkup unit is configured to determine that the portable device, which transmitted the response signal, is inside the vehicle compartment, when the response signal includes both of the checkup area identification information included in the area identification signals transmitted from the driver-seat side antenna and the assistant-seat side antenna.

4. The vehicular keyless entry system according to claim 2, wherein:

the checkup unit is configured to determine that the portable device, which transmitted the response signal, is outside the vehicle compartment, when the response signal includes the checkup area identification information included in the area identification signal transmitted from the driver-seat side antenna and does not include the checkup area information included in the area identification signal transmitted from the assistant-seat side antenna.

5. The vehicular keyless entry system according to claim 2, wherein:

the checkup unit is configured to determine that the portable device, which transmitted the response signal, is outside the vehicle compartment, when the response signal includes the checkup area identification information included in the area identification signal transmitted from the assistant-seat side antenna and does not include the checkup area information included in the area identification signal transmitted from the driver-seat side antenna.

6. The portable device according to claim 1, further comprising:

the memory control circuit is configured to erase all the checkup area identification information stored in the memory circuit when a predetermined period elapses after the request signal is received from the in-vehicle device.

7. The vehicular keyless entry system according to claim 1, wherein when each of the portable devices receive the checkup area identification information for two different area identification signals, the checkup area identification information for both of the received area identification signals are stored in the memory circuit and the response signal includes the checkup area identification information for both of the received area identification signals.

* * * * *